United States Patent
Jaderberg et al.

(10) Patent No.: US 10,032,089 B2
(45) Date of Patent: Jul. 24, 2018

(54) SPATIAL TRANSFORMER MODULES

(71) Applicant: DeepMind Technologies Limited, London (GB)

(72) Inventors: Maxwell Elliot Jaderberg, London (GB); Karen Simonyan, London (GB); Andrew Zisserman, London (GB); Koray Kavukcuoglu, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 15/174,133

(22) Filed: Jun. 6, 2016

(65) Prior Publication Data

US 2016/0358038 A1    Dec. 8, 2016

Related U.S. Application Data

(60) Provisional application No. 62/171,997, filed on Jun. 5, 2015.

(51) Int. Cl.
*G06K 9/46* (2006.01)
*G06K 9/36* (2006.01)
(Continued)

(52) U.S. Cl.
CPC ............ *G06K 9/527* (2013.01); *G06K 9/03* (2013.01); *G06K 9/4628* (2013.01);
(Continued)

(58) Field of Classification Search
CPC ........ G06K 9/527; G06K 9/03; G06K 9/4628; G06N 3/088; G06N 3/0454
(Continued)

(56) References Cited

U.S. PATENT DOCUMENTS 5,067,095 A * 11/1991 Peterson .................. G06N 3/04
706/20
5,220,640 A * 6/1993 Frank .................. G06K 9/6206
704/202

(Continued)

FOREIGN PATENT DOCUMENTS

WO    WO 1998/40824    9/1998

OTHER PUBLICATIONS

International Search Report and Written Opinion in International Application No. PCT/US2016/035892, dated Oct. 26, 2016, 20 pages.

(Continued)

*Primary Examiner* — Sheela C Chawan
(74) *Attorney, Agent, or Firm* — Fish & Richardson P.C.

(57) ABSTRACT

Methods, systems, and apparatus, including computer programs encoded on computer storage media, for processing inputs using an image processing neural network system that includes a spatial transformer module. One of the methods includes receiving an input feature map derived from the one or more input images, and applying a spatial transformation to the input feature map to generate a transformed feature map, comprising: processing the input feature map to generate spatial transformation parameters for the spatial transformation, and sampling from the input feature map in accordance with the spatial transformation parameters to generate the transformed feature map.

22 Claims, 3 Drawing Sheets

(51) Int. Cl.
G06N 3/02 (2006.01)
G06K 9/52 (2006.01)
G06N 3/04 (2006.01)
G06K 9/03 (2006.01)
G06N 3/08 (2006.01)

(52) U.S. Cl.
CPC .......... *G06N 3/0454* (2013.01); *G06N 3/084* (2013.01); *G06N 3/088* (2013.01)

(58) Field of Classification Search
USPC ....... 382/155, 156, 157, 201, 210, 190, 276; 706/15, 17
See application file for complete search history.

(56) References Cited

U.S. PATENT DOCUMENTS

| | | | | |
|---|---|---|---|---|
| 5,835,901 | A * | 11/1998 | Duvoisin, III | G06K 9/627 706/16 |
| 8,260,063 | B2 * | 9/2012 | Hasezawa | G06K 9/00127 382/225 |
| 8,463,025 | B2 * | 6/2013 | Melvin | G06K 9/00979 382/156 |
| 9,396,415 | B2 * | 7/2016 | Chertok | G06N 3/02 |
| 2011/0182469 | A1 | 7/2011 | Ji et al. | |
| 2012/0275690 | A1 | 11/2012 | Melvin et al. | |
| 2015/0100530 | A1 | 4/2015 | Mnih et al. | |

OTHER PUBLICATIONS

Jaderberg et al., "Reading Text in the Wild with Convolutional Neural Networks," International Journal of Computer Vision, 2016, 116(1):1-20.
Ba et al., "Multiple Object Recognition with Visual Attention," Published as a conference paper at ICLR 2015 [online] (retrieved from https://arxiv.org/pdf/1412.7755.pdf), 10 pages.
Bruna and Mallat, "Invariant Scattering Convolution Networks," IEEE Transactions on Pattern Analysis and Machine Intelligence, 2013, 35(8):1872-1886.
Cohen and Welling, "Transformation Properties of Learned Visual Representations," Published as a conference paper at ICLR 2015 [online] (retrieved from http://www.ics.uci.edu/~welling/publications/papers/LatentGroupReps_ICLR.pdf), 11 pages.
Erhan et al., "Scalable Object Detection using Deep Neural Networks," (2014) [online] (retrieved from http://www.cv-foundation.org/openaccess/content_cvpr_2014/papers/Erhan_Scalable_Object_Detection_2014_CVPR_paper.pdf), 8 pages.
Girshick et al., "Rich Feature Hierarchies for Accurate Object Detection and Semantic Segmentation," (Oct. 22, 2014) [online] (retrieved from http://arxiv.org/pdf/1311.2524v5.pdf), 21 pages.
Gregor et al., "DRAW: A Recurrent Neural Network for Image Generation," (May 20, 2015) [online] (retrieved from https://arxiv.org/pdf/1502.04623v2.pdf), 10 pages.
Hinton et al., "Transforming Auto-encoders," in ICANN 2011 [online] (retrieved from http://www.cs.toronto.edu/~fritz/absps/transauto6.pdf) 8 pages.
Hinton, "A Parallel Computation that Assigns Canonical Object-based Frames of Reference," in Proceedings of the 7th International Joint Conference on Artificial Intelligence, Vancouver, BC, Canada, 1991, 3 pages.
Kanazawa et al., "Locally Scale-invariant Convolutional Neural Networks," (Dec. 16, 2014) [online] (retrieved from http://arxiv.org/pdf/1412.5104v1.pdf), 11 pages.
Lenc and Vedaldi, "Understanding Image Representations by Measuring their Equivariance and Equivalence," (2015) [online] (retrieved from http://www.robots.ox.ac.uk/~vedaldi/assets/pubs/lenc15understanding.pdf), 9 pages.
Simonyan and Zisserman, "Very Deep Convolutional Networks for Large-scale Image Recognition," Published as a conference paper at ICLR 2015 [online] (retrieved from http://arxiv.org/pdf/1409.1556v6.pdf), 14 pages.
Sohn and Lee, "Learning Invariant Representations with Local Transformations," (2012).
Schmidhuber and Huber, "Learning to Generate Artificial Fovea Trajectories for Target Detection," International Journal of Neural Systems, 1991, 2(1&2):135-141.
Sermanet et al., "Attention for Fine-grained Categorization," (Dec. 22, 2014) [online] (retrieved from https://arxiv.orgipdf/1412.7054v1.pdf), 6 pages.
Szegedy et al., "Going Deeper with Convolutions," (Sep. 17, 2014) [online] (retrieved from https://arxiv.org/pdf/1409.4842v1.pdf), 12 pages.
Tieleman, "Optimizing Neural Networks that Generate Images," PhD Thesis, University of Toronto, 2014, 120 pages.

* cited by examiner

SPATIAL TRANSFORMER MODULES

CROSS-REFERENCE TO RELATED APPLICATION

This application claims priority to U.S. Provisional Application No. 62/171,997, filed on Jun. 5, 2015. The disclosure of the prior application is considered part of and is incorporated by reference in the disclosure of this application.

BACKGROUND

This specification relates to processing image data through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes image processing neural networks that are implemented by one or more computers and that include one or more spatial transformer modules.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. By modifying the architecture of a neural network to include one or more spatial transformer modules, the neural network can be trained to actively spatially transform feature maps, conditional on the feature map itself, without any extra training supervision or modification to the optimization, i.e., training, process. Moreover, the use of spatial transformers results in neural networks which learn invariance to translation, scale, rotation and more generic warping, resulting in state-of-the-art or better than state-of-the-art performance on several benchmarks, and for a number of classes of transformations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an image processing neural network system implemented as computer programs on one or more computers in one or more locations that includes at least one spatial transformer module.

The image processing neural network system processes input image data that includes one or more images to generate a neural network output for the one or more images.

The image processing neural network system can be configured to generate any kind of neural network output for the one or more images.

For example, the image processing neural network system can be configured to classify input images as including images of objects from one or more object categories, i.e., to generate a neural network output for an input image that includes a respective score for each of the one or more object categories that represents a likelihood that the input image includes an image of an object that belongs to the object category. An example of an image processing neural network for classifying input images that can be modified to include one or more spatial transformer modules as described in this specification is described in C. Szegedy, W. Liu, Y. Jia, P. Sermanet, S. Reed, D. Anguelov, D. Erhan, V. Vanhoucke, and A. Rabinovich, "Going deeper with convolutions," https://arxiv.org/pdf/1409.4842v1.pdf (2014).

As another example, the image processing neural network system can be configured to identify locations of objects in input images. For example, the system can receive as input a set of images that each include an image of an object from the same unknown category and can generate a neural network output that identifies the location of the object in each of the images. An example of an image processing neural network for localizing objects in images that can be modified to include one or more spatial transformer modules is described in K. Simonyan and A. Zisserman. Very deep convolutional networks for large-scale image recognition. ICLR, 2015.

As another example, the image processing neural network system can be configured to reconstruct an input image, i.e., to generate an output image that matches the input image. An example of a system that is configured to reconstruct input images and that can be modified to include one or more spatial transformer modules is described in K. Gregor, I. Danihelka, A. Graves, and D. Wierstra. Draw: A recurrent neural network for image generation. ICML, 2015.

Figure 1:
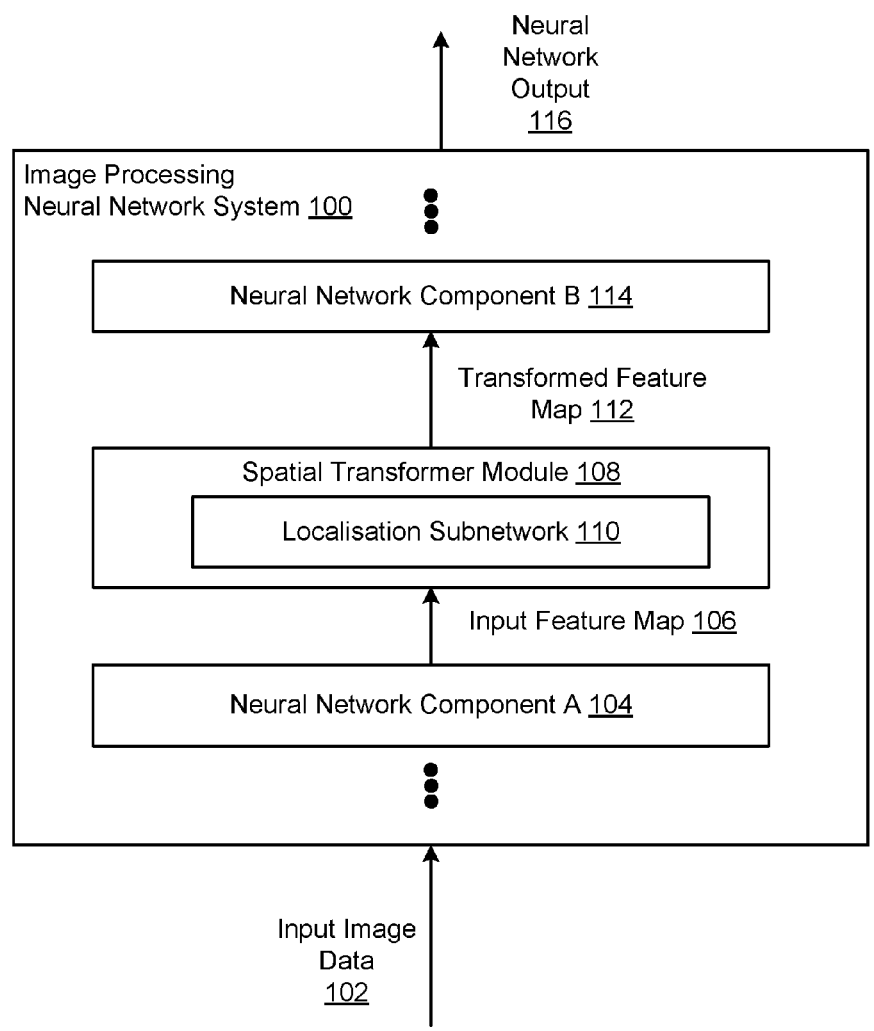
FIG. 1 shows an example image processing neural network system.

FIG. 1 shows an example image processing neural network system 100. The image processing neural network system 100 is an example of a system implemented as computer programs on one or more computers in one or more locations, in which the systems, components, and techniques described below can be implemented.

The image processing neural network system 100 receives input image data 102 that includes one or more images and processes the input image data 102 to generate a neural network output 116. As described above, the image processing neural network system 100 can be configured to generate various kinds of neural network outputs for received input images.

The image processing neural network system 100 includes multiple neural network components that are arranged within the system 100 so that each component receives as input (i) an output generated by one or more of the other components in the image processing neural network system 100, (ii) some or all of the input image data 102, or (iii) both and processes the received input to generate a component output.

The components may include neural network layers, subnetworks, neural network modules or other conventional neural network components that generate outputs from inputs in accordance with current values of a set of parameters for the components.

The components also include one or more spatial transformer modules.

In particular, in the example of FIG. 1, the image processing neural network system 100 includes a spatial transformer module 108 inserted between a neural network component A 104 and a neural network component B 114.

Depending on the configuration of the image processing neural network system 100, the neural network component A 104 may be a conventional neural network component, e.g., a neural network layer, or another spatial transformer module. Similarly, the neural network component B 114 may also be a conventional neural network component or another spatial transformer module.

During the processing of the input image data 102 by the image processing neural network system 100, the spatial transformer module 108 is configured to apply a spatial transformation to an input feature map 106 received from the neural network component A 104 to generate a transformed feature map 112 that is provided as input to the neural network component B 114. In a different example from the one shown in FIG. 1, the input feature map 106 may be some or all of the image data 102 instead of an output generated by another component of the system 100.

Generally, a feature map is a H×W×C tensor having width W, height H, and number of channels C. Depending on where in the image processing neural network system 100 the spatial transformed module 108 is located, the number of channels may be greater than one, e.g., in the case where the feature map is a multi-channel image or a multi-channel output of a convolutional neural network layer, or one. Elements of a given feature map will be referred to in this specification as pixels.

The spatial transformer module 108 is configured to perform a particular type of spatial transformation that is conditioned on the input feature map 106, i.e., so that the spatial transformer module 108 applies different transformations of the same type to different feature maps. For multi-channel input feature maps, the same warping is generally applied to each channel of the feature map.

Generally, the type of transformation that the spatial transformer module 108 is configured to perform can be any transformation that has a parameterized form and that is differentiable with respect to the parameters of the transformation.

For example, the spatial transformer module 108 can be configured to perform a two-dimensional affine transformation that can be expressed as a matrix $A_\theta$ of parameters $\theta$:

$$\begin{bmatrix} \theta_{11} & \theta_{12} & \theta_{13} \\ \theta_{21} & \theta_{22} & \theta_{23} \end{bmatrix}$$

Such a transformation can allow cropping, translation, rotation, scaling, and skew to the input feature map, depending on the values of $\theta$. As another example, the transformation may be of a more constrained type:

$$\begin{bmatrix} s & 0 & t_x \\ 0 & s & t_y \end{bmatrix},$$

where s, $t_x$, and $t_y$ are the parameters of the transformation. Such a more-constrained transformation can allow cropping, translation, and isotropic scaling, depending on the values of s, $t_x$, and $t_y$.

As yet other examples, the transformation can be a plane projective transformation with eight parameters, a piecewise affine transformation, or a thin plate spline transformation.

To generate the parameters for the type of transformation that the spatial transformer module 108 is configured to perform, the spatial transformer module processes the input feature map 106 using a localisation subnetwork 110.

The localisation subnetwork 110 is a neural network that is configured to process the input feature map 106 to generate the parameters of the transformation. The number of parameters that the localisation subnetwork 110 generates is dependent on the type of transformation, e.g., six parameter values for the two-dimensional affine transformation shown above and three parameter values for the more-constrained transformation shown above. The localisation network function 110 can take any appropriate form, e.g., a fully-connected network or a convolutional network, but generally includes a final regression layer that produces the transformation parameters.

The spatial transformer module 108 then samples from the input feature map 106 in accordance with the spatial transformation parameters to generate the transformed feature map 112. Applying a spatial transformation to an input feature map is described in more detail below with reference to FIGS. 2 and 3.

Figure 2:
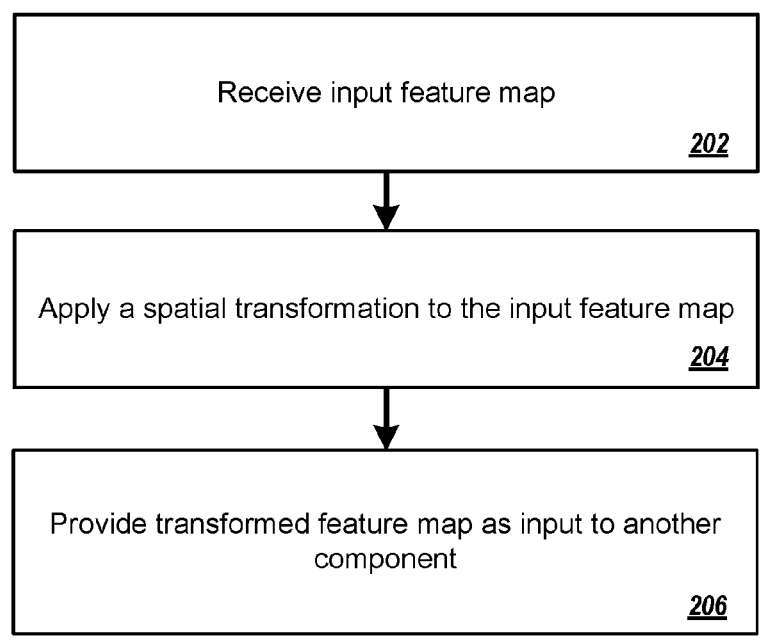
FIG. 2 is a flow diagram of an example process for processing an input using a spatial transformer module.

FIG. 2 is a flow diagram of an example process 200 for processing a received feature map. For convenience, the process 200 will be described as being performed by a system of one or more computers located in one or more locations. For example, a spatial transformer module included in a image processing neural network system, e.g., the spatial transformer module 108 included in the image processing neural network system 100 of FIG.1, appropriately programmed, can perform the process 200.

The spatial transformer module receives an input feature map derived from input image data being processed by the image processing neural network system (step 202). In some implementations, the input image data is an input image. In some other implementations, the input feature map is an output generated by another component within the image processing neural network system.

The spatial transformer module applies a spatial transformation to the input feature map to generate a transformed feature map (step 204). Applying the spatial transformation is described in more detail below with reference to FIG. 3.

The spatial transformer module provides the transformed feature map as input to another component in the image processing neural network system (step 206), e.g., to a neural network layer or to another spatial transformer module.

Figure 3:
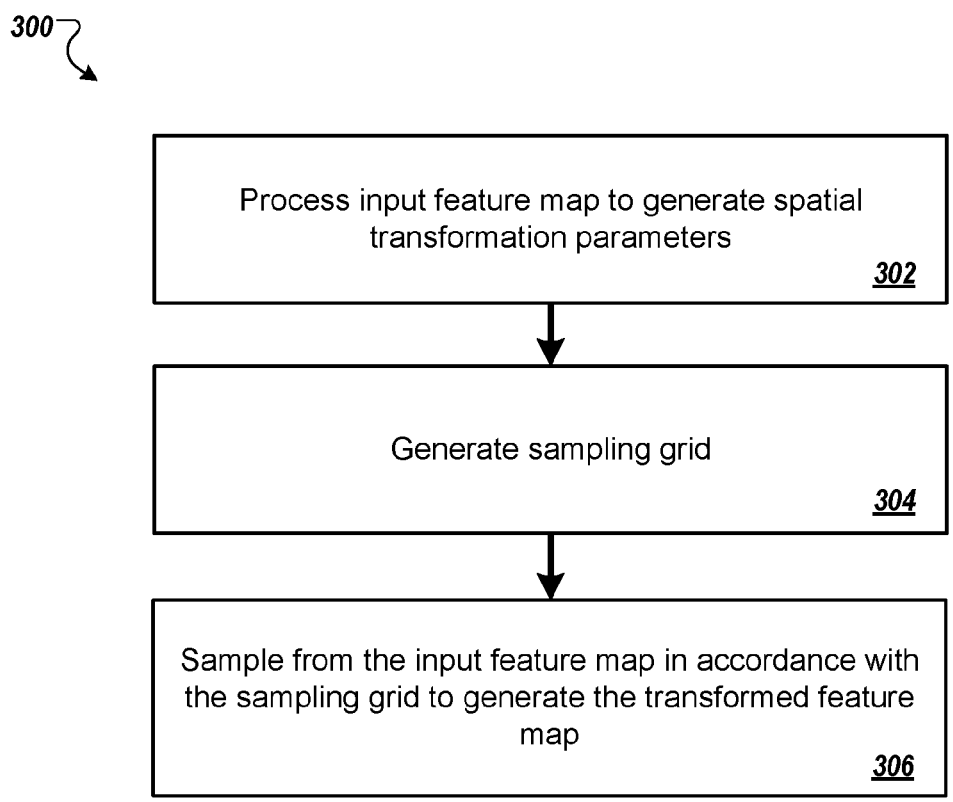
FIG. 3 is a flow diagram of an example process for generating a transformed feature map.

FIG. 3 is a flow diagram of an example process 300 for generating a transformed feature map. For convenience, the process 300 will be described as being performed by a system of one or more computers located in one or more locations. For example, a spatial transformer module included in a image processing neural network system, e.g., the spatial transformer module 108 included in the image processing neural network system 100 of FIG.1, appropriately programmed, can perform the process 300.

The spatial transformer module processes the input feature map to generate spatial transformation parameters (step 302).

In particular, the spatial transformer module processes the input feature map using a localisation subnetwork that is configured to process the input feature map to generate the spatial transformation parameters in accordance with current values of a set of parameters. As described above, the localisation subnetwork can take any appropriate form but generally includes a final regression layer that produces the transformation parameters and the number of the parameters generated by the localisation subnetwork varies depending on the transformation type that is parameterized. For example, for an affine transformation, the localisation subnetwork may be configured to output six transformation parameter values.

The spatial transformer module generates a sampling grid using the transformation parameters (step 304). The sampling grid defines, for each of multiple locations in the transformed feature map, how a value of the location should be derived from values in the input feature map. To generate the sampling grid, the system transforms a regular grid covering the entire transformed feature map, i.e., each pixel of the transformed feature map, into a grid covering some or all of the input feature map using the transformation parameters.

For example, in the affine transformation case, the pointwise transformation used to transform the regular grid may satisfy:

$$\begin{pmatrix} x_i^s \\ y_i^s \end{pmatrix} = \begin{bmatrix} \theta_{11} & \theta_{12} & \theta_{13} \\ \theta_{21} & \theta_{22} & \theta_{23} \end{bmatrix} \begin{pmatrix} x_i^t \\ y_i^t \\ 1 \end{pmatrix},$$

where $(x_i^t, y_i^t)$ are the target coordinates of the regular grid in the transformed feature map and $(x_i^s, y_i^s)$ are the source coordinates in the input feature map.

The spatial transformer module samples from the input feature map in accordance with the sampling grid to generate the transformed feature map (step 306).

In particular, to determine the value of a particular pixel in the transformed feature map, the spatial transformer module applies a sampling kernel centered at a particular location specified by the sampling grid in the input feature map. In some implementations, the value $V_i^c$ of a pixel at location $(x_i^t, y_i^t)$ of channel c in the transformed feature map generated by the sampling satisfies:

$$V_i^c = \Sigma_n^H \Sigma_m^W U_{nm}^c k(x_i^s - m; \Phi_x) k(y_i^s - n; \Phi_y),$$

where $\Phi_x$ and $\Phi_y$ are the parameters of a sampling kernel k( )which defines the feature map interpolation and $U_{nm}^c$ is the value at location (n, m) in channel c of the input feature map.

The sampling kernel may be any sampling kernel for which sub-gradients can be defined with respect to $x_i^s$ and $y_i^s$. For example, the sampling kernel may be an integer sampling kernel or a bilinear sampling kernel.

Thus, depending on the type of transformation that the spatial transformer module is configured to apply, the transformed feature map may have the same H and W dimensions as the input feature map or different H and W dimensions from those of the input feature map.

Because the sampling mechanism is differentiable, i.e., because the sampling kernel allows for sub-gradients to be defined with respect to $x_i^s$ and $y_i^s$ and because the transformation is a transformation that has a parameterized form and is differentiable with respect to those parameters, the spatial transformer module can be been trained using backpropagation during training of the image processing neural network system.

In particular, during the training of the image processing neural network system, the system can backpropagate gradients computed from errors between the neural network outputs generated by the image processing neural network and known outputs for the training images to train the spatial transformer module, i.e., to adjust the values of the parameters of the localisation subnetwork and, optionally, of the sampling kernel.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An image processing neural network system implemented by one or more computers, wherein the image processing neural network system is configured to receive one or more input images and to process the one or more input images to generate a neural network output from the one or more input images, the image processing neural network system comprising:
 a spatial transformer module, wherein the spatial transformer module is configured to perform operations comprising:
  receiving an input feature map derived from the one or more input images, and
  applying a spatial transformation to the input feature map to generate a transformed feature map, comprising:
   processing the input feature map to generate, based on the input feature map, spatial transformation parameters that define the spatial transformation to be applied to the input feature map, and sampling from the input feature map in accordance with the spatial transformation parameters generated based on the input feature map to generate the transformed feature map.

2. The image processing neural network system of claim 1, the operations further comprising:

providing the transformed feature map as input to another component of the image processing neural network system.

3. The image processing neural network system of claim 1, wherein the input feature map is an output generated by another component of the image processing neural network system.

4. The image processing neural network system of claim 3, wherein the other component of the image processing neural network system is another spatial transformer module.

5. The image processing neural network system of claim 4, wherein the other spatial transformer module performs a different type of spatial transformation than the spatial transformer module.

6. The image processing neural network system of claim 3, wherein the other component of the image processing neural network system is a neural network layer.

7. The image processing neural network system of claim 1, wherein the input feature map is one of the one or more input images.

8. The image processing neural network system of claim 1, wherein the spatial transformer module comprises:
a localisation subnetwork comprising one or more neural network layers, wherein the localisation subnetwork is configured to process the input feature map to generate the spatial transformation parameters in accordance with current values of a set of parameters of the localisation subnetwork, and
wherein processing the input feature map to generate the spatial transformation parameters comprises processing the input feature map using the localisation subnetwork.

9. The image processing neural network system of claim 1, wherein sampling from the input feature map in accordance with the spatial transformation parameters to generate the transformed feature map comprises:

generating, using the transformation parameters, a sampling grid that defines, for each of a plurality of locations in the transformed feature map, how a value of the location should be derived from values in the input feature map; and sampling from the input feature map in accordance with the sampling grid to generate the transformed feature map.

10. The image processing neural network system of claim 1, wherein the sampling mechanism is differentiable.

11. The image processing neural network system of claim 10, wherein the spatial transformer module has been trained using backpropagation during training of the image processing neural network system.

12. The image processing neural network system of claim 1, wherein the transformed feature map has the same dimensions as the input feature map.

13. The image processing neural network system of claim 1, wherein the transformed feature map has different dimensions from the input feature map.

14. One or more non-transitory computer storage media encoded with instructions that, when executed by one or more computers, cause the one or more computers to implement an image processing neural network that is configured to receive one or more input images and to process the one or more input images to generate a neural network output from the one or more input images, the image processing neural network comprising:

a spatial transformer module, wherein the spatial transformer module is configured to perform operations comprising:
receiving an input feature map derived from the one or more input images, and
applying a spatial transformation to the input feature map to generate a transformed feature map, comprising:
processing the input feature map to generate, based on the input feature map, spatial transformation parameters that define the spatial transformation to be applied to the input feature map, and
sampling from the input feature map in accordance with the spatial transformation parameters generated based on the input feature map to generate the transformed feature map.

15. The computer storage media of claim 14, the operations further comprising:

providing the transformed feature map as input to another component of the image processing neural network system.

16. The computer storage media of claim 14, wherein the input feature map is an output generated by another component of the image processing neural network system.

17. The computer storage media of claim 14, wherein the input feature map is one of the one or more input images.

18. The computer storage media of claim 14, wherein the spatial transformer module comprises:
a localisation subnetwork comprising one or more neural network layers, wherein the localisation subnetwork is configured to process the input feature map to generate the spatial transformation parameters in accordance with current values of a set of parameters of the localisation subnetwork, and
wherein processing the input feature map to generate the spatial transformation parameters comprises processing the input feature map using the localisation subnetwork.

19. The computer storage media of claim 14, wherein sampling from the input feature map in accordance with the spatial transformation parameters to generate the transformed feature map comprises:

generating, using the transformation parameters, a sampling grid that defines, for each of a plurality of locations in the transformed feature map, how a value of the location should be derived from values in the input feature map; and sampling from the input feature map in accordance with the sampling grid to generate the transformed feature map.

20. A method comprising:

training an image processing neural network on training images, wherein the image processing neural network is configured to receive one or more input images and to process the one or more input images to generate a neural network output from the one or more input images, wherein the image processing neural network comprises a spatial transformer module, wherein the spatial transformer module is configured to perform operations comprising:
  receiving an input feature map derived from the one or more input images, and applying a spatial transformation to the input feature map to generate a transformed feature map, comprising: processing the input feature map to generate, based on the input feature map, spatial transformation parameters that define the spatial transformation to be applied to the input feature map, and sampling from the input feature map in accordance with the spatial transformation parameters generated based on the input feature map to generate the transformed feature map, and
wherein training the image processing neural network comprises:
  backpropagating gradients computed from errors between the neural network outputs generated by the image processing neural network for the training images and known outputs for the training images to train the spatial transformer module.

21. The method of claim 20, wherein the spatial transformer module comprises a localisation subnetwork comprising one or more neural network layers, wherein the localisation subnetwork is configured to process the input feature map to generate the spatial transformation parameters in accordance with current values of a set of parameters of the localisation subnetwork.

22. The method of claim 21, wherein the sampling mechanism is differentiable, and wherein backpropagating the gradients comprises backpropagating the gradients through the sampling mechanism to adjust the values of the parameters of the localisation subnetwork.

* * * * *

UNITED STATES PATENT AND TRADEMARK OFFICE
CERTIFICATE OF CORRECTION

PATENT NO. : 10,032,089 B2
APPLICATION NO. : 15/174133
DATED : July 24, 2018
INVENTOR(S) : Jaderberg et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 28 days.

Signed and Sealed this
Twenty-third Day of April, 2019

Andrei Iancu
*Director of the United States Patent and Trademark Office*